United States Patent
Aksit et al.

(10) Patent No.: US 6,637,751 B2
(45) Date of Patent: Oct. 28, 2003

(54) SUPPLEMENTAL SEAL FOR THE CHORDAL HINGE SEALS IN A GAS TURBINE

(75) Inventors: Mahmut Faruk Aksit, Istanbul (TR); Ahmad Safi, Troy, NY (US); Abdul-Azeez Mohammed-Fakir, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/028,925

(22) Filed: Dec. 28, 2001

(65) Prior Publication Data
US 2003/0122312 A1 Jul. 3, 2003

(51) Int. Cl.[7] ............................. F16J 15/02; F04D 29/08
(52) U.S. Cl. ...................... 277/416; 277/543; 277/637; 277/653; 415/174.2; 415/191
(58) Field of Search ................... 277/543, 637, 277/650, 652, 653, 654, 355, 416; 415/189, 191, 209.2, 174.2, 174.3

(56) References Cited

U.S. PATENT DOCUMENTS

| | | | | |
|---|---|---|---|---|
| 4,645,217 A | * | 2/1987 | Honeycutt et al. | 277/555 |
| 4,863,343 A | * | 9/1989 | Smed | 415/138 |
| 5,118,120 A | * | 6/1992 | Drerup et al. | 277/628 |
| 5,224,822 A | * | 7/1993 | Lenahan et al. | 415/189 |
| 5,474,306 A | * | 12/1995 | Bagepalli et al. | 277/355 |
| 5,509,669 A | * | 4/1996 | Wolfe et al. | 277/654 |
| 5,586,773 A | * | 12/1996 | Bagepalli et al. | 277/650 |
| 5,657,998 A | * | 8/1997 | Dinc et al. | 277/653 |
| 5,797,723 A | * | 8/1998 | Frost et al. | 415/174.2 |
| 5,915,697 A | * | 6/1999 | Bagepalli et al. | 277/627 |
| 5,934,687 A | * | 8/1999 | Bagepalli et al. | 277/637 |
| 6,162,014 A | * | 12/2000 | Bagepalli et al. | 415/170.1 |

* cited by examiner

*Primary Examiner*—Anthony Knight
*Assistant Examiner*—Alison K. Pickard
(74) *Attorney, Agent, or Firm*—Nixon & Vanderhye

(57) ABSTRACT

In a gas turbine having a chordal hinge seal between an inner rail of each nozzle segment and an annular axially facing sealing surface of a nozzle support ring, a supplemental seal is disposed between the support ring and inner band of the nozzle segment on a high pressure side of the chordal hinge seal. The supplemental seal includes a pair of sheet metal shims overlaid by a woven metallic cloth supported by a bracket secured to the inner margin of the inner rail. The radially inner end of the cloth seal bears against the annular sealing surface of the nozzle support ring. The shims of the legs of the supplemental seal are slit along their distal margin and staggered circumferentially relative to one another to provide flexibility and effective sealing engagement with the nozzle support ring.

21 Claims, 9 Drawing Sheets

SUPPLEMENTAL SEAL FOR THE CHORDAL HINGE SEALS IN A GAS TURBINE

BACKGROUND OF THE INVENTION

The present invention relates to seals in a gas turbine for supplementing the chordal hinge seals between turbine nozzles and a turbine nozzle support ring and particularly relates to supplementary seals for substantially minimizing or eliminating leakage losses past the chordal hinge seals.

In a gas turbine, hot gases of combustion flow from combustors through first-stage nozzles and buckets and through the nozzles and buckets of follow-on turbine stages. The first-stage nozzles typically include an annular array or assemblage of cast nozzle segments each containing one or more nozzle stator vanes per segment. Each first-stage nozzle segment also includes inner and outer band portions spaced radially from one another. Upon assembly of the nozzle segments, the stator vanes are circumferentially spaced from one another to form an annular array thereof between annular inner and outer bands. A nozzle retaining ring coupled to the outer band of the first-stage nozzles supports the first-stage nozzles in the gas flow path of the turbine. An annular nozzle support ring, preferably split at a horizontal midline, is engaged by the inner band and supports the first-stage nozzles against axial movement.

In an exemplary arrangement, eighteen cast segments are provided with two vanes per segment. The annular array of segments are sealed one to the other along adjoining circumferential edges by side seals. The side seals seal between a high pressure region radially inwardly of the inner band, i.e., compressor discharge air at high pressure, and the hot gases of combustion in the hot gas flow path which are at a lower pressure.

Chordal hinge seals are used to seal between the inner band of the first-stage nozzles and an axially facing surface of the nozzle support ring. Each chordal hinge seal includes an axial projection which extends linearly along a chord line of the inner band portion of each nozzle segment. Particularly, the chordal hinge seal extends along an inner rail of each segment and which rail extends radially inwardly of the inner band portion. The chordal hinge seal projection lies in sealing engagement with the axially opposite facing sealing surface of the nozzle support ring.

During operation and/or repair of the first-stage nozzle, it has been found that warpage can leave gaps between the chordal hinge seals and the sealing surface of the nozzle support ring. These gaps enable leakage past the chordal hinge seals from the high pressure area radially within the annular inner band into the hot gas flow path. That is, the chordal hinge seals are inadequate to prevent leakage flow as the chordal hinge seal projections lose contact with the sealing surface of the nozzle support ring. Consequently, there is a need for a supplemental seal at the interface of the first-stage nozzles and nozzle support ring to minimize or eliminate the leakage flow past the chordal hinge seals.

BRIEF DESCRIPTION OF THE INVENTION

In accordance with a preferred embodiment of the present invention, there is provided a supplemental seal between the first-stage nozzles and the nozzle support ring which eliminates or minimizes leakage past the chordal hinge seals and which is readily and easily installed. In a preferred embodiment, the supplemental seal includes at least one and preferably two back-to-back sheet metal shims wrapped in a woven metallic cloth attached to the inner radial margin of the inner rail of each nozzle segment. The supplemental seal extends from the inner rail for engagement against a first surface of the nozzle support ring at a location radially inwardly of the chordal hinge seal. The high pressure compressor discharge air in a high pressure region of the turbine biases the cloth seal against the annular surface of the nozzle support ring.

Particularly, the cloth seal and shims are secured along the back side of a support bracket. The radial outer edge of the support bracket and cloth seal and shims are secured in a groove formed along the inner margin of the inner rail. The seal extends arcuately in a circumferential direction and is provided in two or four circumferential segments 90° or 180°, respectively. Because the nozzle segments are in excess of the number of circumferential supplemental seals, the supplemental seal segments overlie multiple nozzle segments, particularly at the joint between segments, thereby reducing inter-segment leakage. Alternatively, the inter-segment gaps between segments can be axially overlaid with overlapped joints of the supplemental seal.

The cloth and shims are shaped to project radially inwardly, turn in an axial direction toward the nozzle support ring and turn again in a radial inward direction to form distal legs on the inner end portions of the seal. The legs of each shim are slit back from their distal edge to form a plurality of fingers. The fingers of one shim overlie the slits of the fingers of the other shim. That is, the slits of the shims are staggered in a circumferential direction relative to one another such that the slits of each shim are effectively sealed by the fingers of the opposing shim. The slits also afford flexibility to the sealing surface of the supplemental seal.

In a preferred embodiment according to the present invention, there is provided a turbine comprising a turbine nozzle support ring having a generally axially facing first surface, a turbine nozzle segment having at least one stator vane and including an inner band having a second surface in axial opposition to the first surface, a seal depending from and extending radially inwardly of the inner band for sealing engagement against the first surface to seal between high and low pressure regions on opposite sides of the seal, the seal including a seal body having at least a first plate, an overlay of a woven metallic cloth and a distal margin covered by the cloth and engaging the first surface and a support bracket secured to the inner band and extending along one side of the seal to support the seal body on a low pressure side thereof, the margin of the seal body being flexible and preloaded to seal against the first surface.

In a further preferred embodiment according to the present invention, there is provided a turbine comprising a turbine nozzle support ring having a generally axially facing first surface, a plurality of turbine nozzle segments each having at least one stator vane and including an inner band having a second surface in axial opposition to the first surface, a seal comprised of a plurality of seal segments depending from and extending radially inwardly of the inner bands for sealing engagement against the first surface to seal between high and low pressure regions on opposite sides of the seal, each seal segment including a seal body having at least a first plate, an overlay of a woven metallic cloth and a distal margin covered by the cloth and engaging the first surface and a plurality of support brackets secured to the inner bands and extending along one side of the seal segments to support the seal bodies on a low pressure side thereof, the margins of the seal bodies being flexible and preloaded to seal against the first surface.

DETAILED DESCRIPTION OF THE INVENTION

Figure 1:
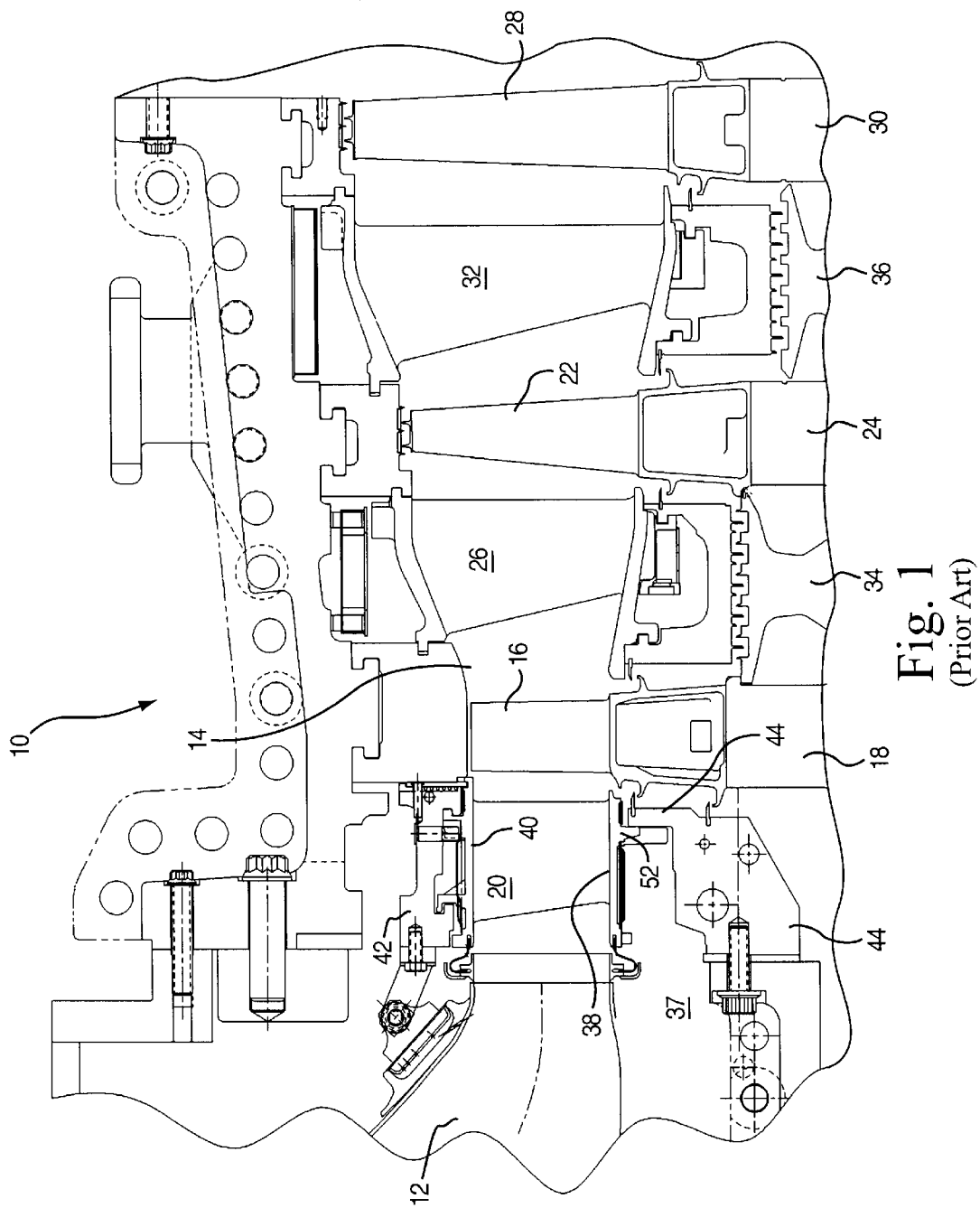
FIG. 1 is a fragmentary schematic side elevational view of a portion of a gas turbine.

Referring now to FIG. 1, there is illustrated a representative example of a turbine section of a gas turbine, generally designated 10. Turbine 10 receives hot gases of combustion from an annular array of combustors, not shown, which transmit the hot gases through a transition piece 12 for flow along an annular hot gas path 14. Turbine stages are disposed along the hot gas path 14. Each stage comprises a plurality of circumferentially spaced buckets mounted on and forming part of the turbine rotor and a plurality of circumferentially spaced stator vanes forming an annular array of nozzles. For example, the first stage includes a plurality of circumferentially-spaced buckets 16 mounted on a first-stage rotor wheel 18 and a plurality of circumferentially-spaced stator vanes 20. Similarly, the second stage includes a plurality of buckets 22 mounted on a rotor wheel 24 and a plurality of circumferentially-spaced stator vanes 26. Additional stages may be provided, for example, a third stage comprised of a plurality of circumferentially-spaced buckets 28 mounted on a third-stage rotor wheel 30 and a plurality of circumferentially-spaced stator vanes 32. It will be appreciated that the stator vanes 20, 26 and 32 are mounted on and fixed to a turbine casing, while the buckets 16, 22 and 28 and wheels 18, 24 and 30 form part of the turbine rotor. Between the rotor wheels are spacers 34 and 36 which also form part of the turbine rotor. It will be appreciated that compressor discharge air is located in a region 37 disposed radially inwardly of the first stage and that such air in region 37 is at a higher pressure than the pressure of the hot gases flowing along the hot gas path 14.

Figure 2:
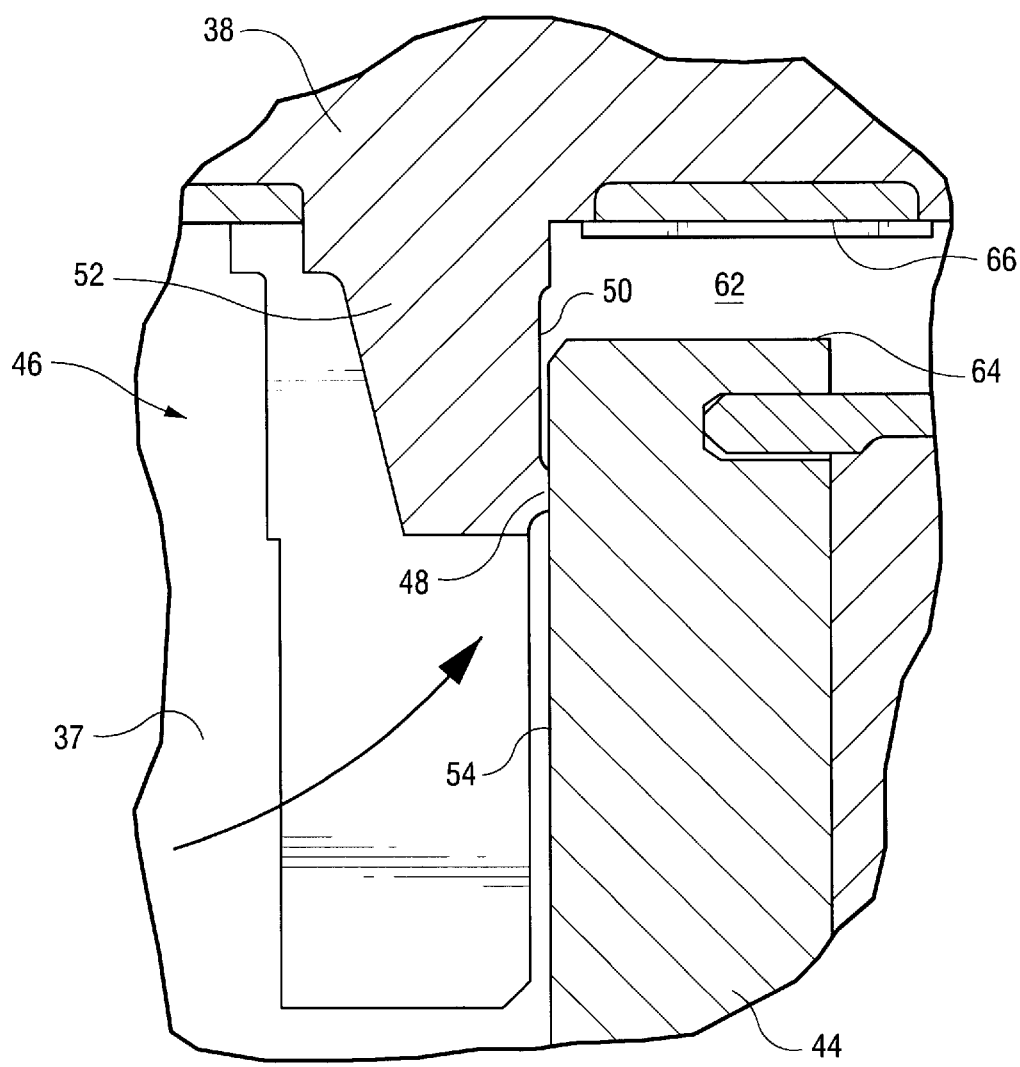
FIG. 2 is an enlarged fragmentary cross-sectional view illustrating a conventional chordal seal hinge.
Figure 3:
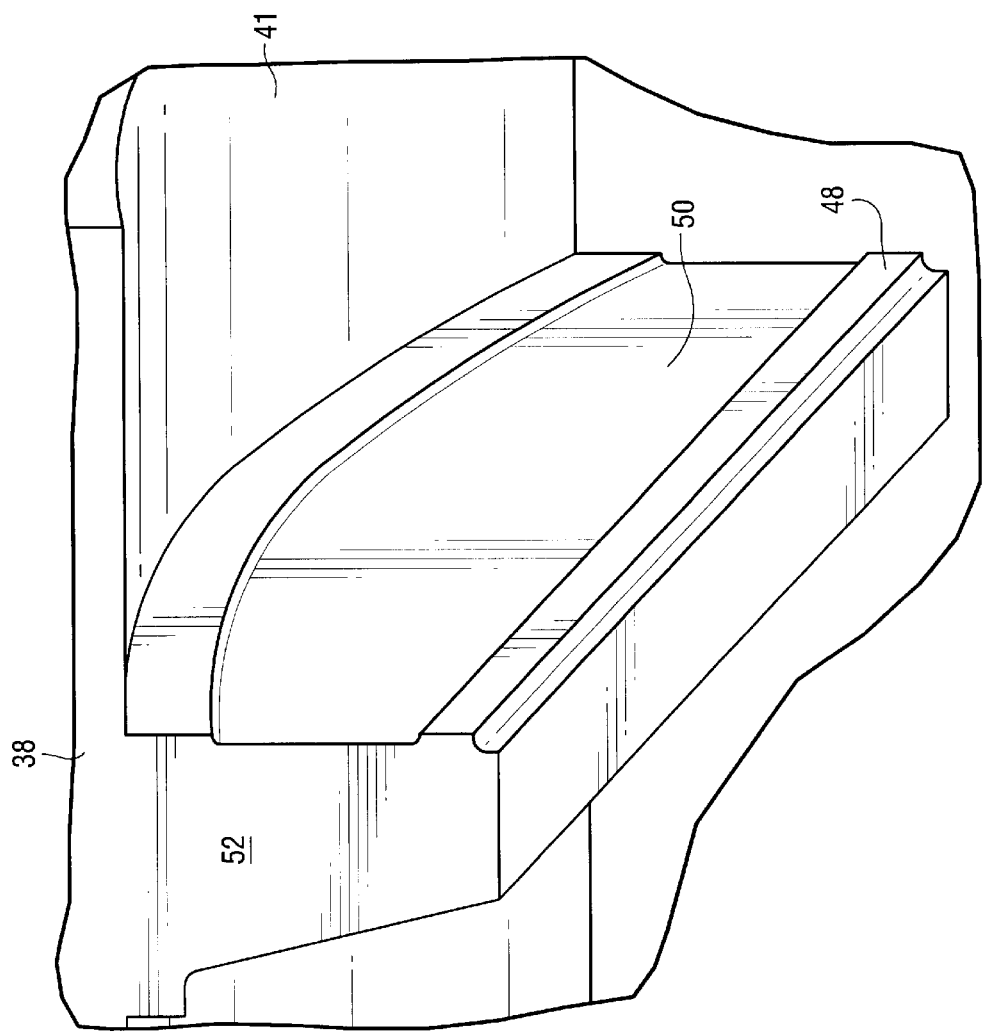
FIG. 3 is a fragmentary perspective view illustrating a portion of a conventional chordal hinge seal along an inner rail of a nozzle segment.
Figure 4:
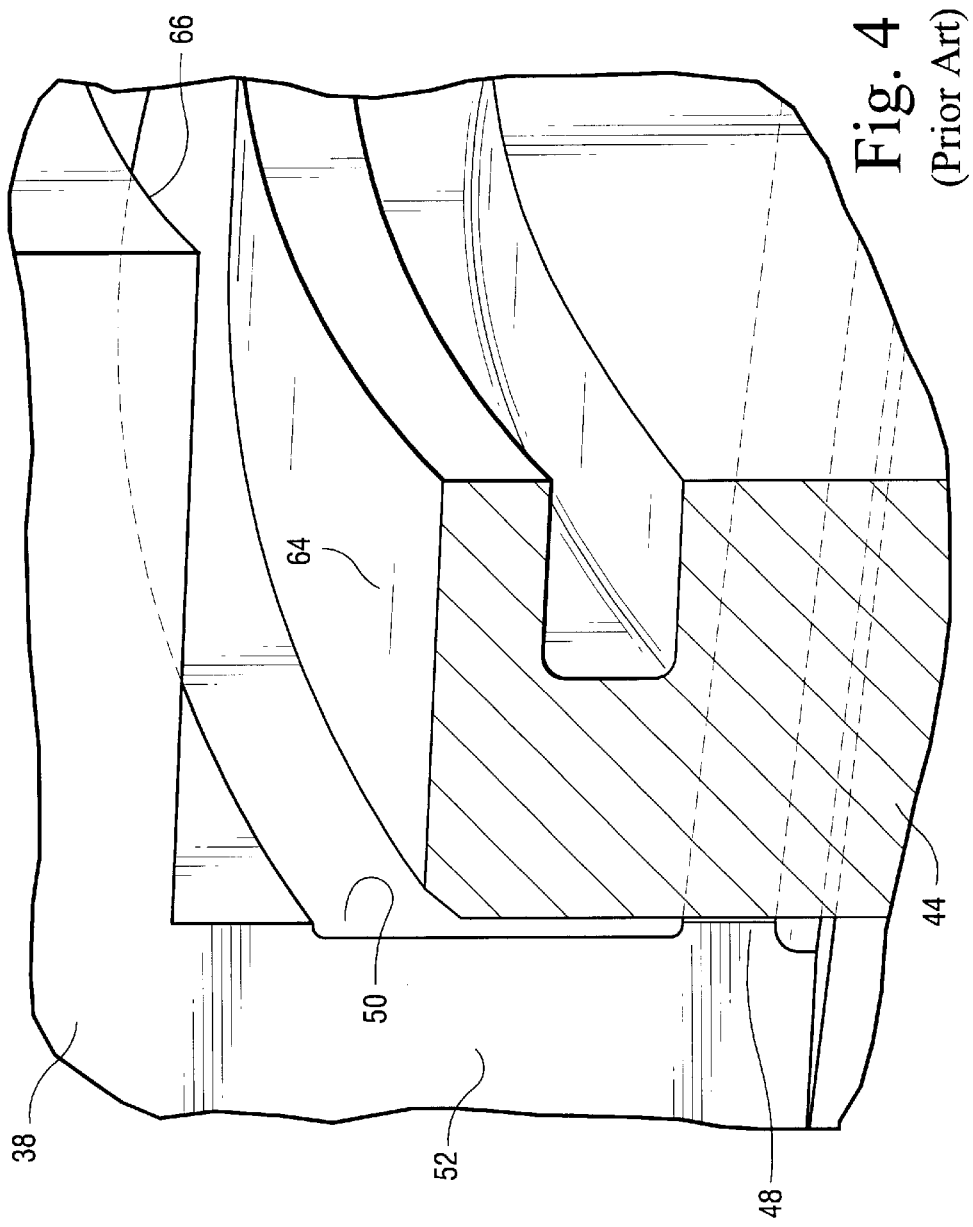
FIG. 4 is a fragmentary perspective view with parts in cross-section illustrating the conventional chordal hinge seal in sealing engagement with a nozzle support ring of the gas turbine.

Referring to the first stage of the turbine, the stator vanes 20 forming the first-stage nozzles are disposed between inner and outer bands 38 and 40, respectively, supported from the turbine casing. As noted above, the nozzles of the first stage are formed of a plurality of nozzle segments 41 (FIG. 3) each mounting one, preferably two, stator vanes extending between inner and outer band portions and arranged in an annular array of segments. A nozzle retaining ring 42 connected to the turbine casing is coupled to the outer band and secures the first-stage nozzle. A nozzle support ring 44 radially inwardly of the inner band 38 of the first-stage nozzles engages the inner band 38. Particularly, the interface between the inner band 38 and the nozzle support ring 44 includes an inner rail 52 (FIG. 2). The inner rail 52 includes a chord-wise, linearly extending axial projection 48, generally and collectively hereinafter referred to as a chordal hinge seal 46. Projection 48 extends along an axial facing surface 50 of the inner rail 52 which forms an integral part of each nozzle segment and specifically the inner band 38. The projection 48 engages a first annular surface 54 of the nozzle support ring 44. It will be appreciated that high pressure compressor discharge air lies in the region 37 and lower pressure hot gases flowing in the hot gas path 14 lie on the opposite side of the seal 48. The chordal hinge seal 46 is thus intended to seal against leakage from the high pressure region 37 into the lower pressure region of the hot gas path 14.

As noted previously, however, when operating the turbine, component parts of the nozzles and nozzle support ring will tend to form leakage gaps between the projection 48 and the surface 54 of the nozzle support ring 44 whereby leakage flow may occur from the high pressure region to the low pressure region. In order to minimize or prevent leakage flow into the hot gas path 14, and in accordance with a preferred embodiment of the present invention, there is provided a supplemental seal for sealing between the first-stage nozzles and the nozzle support ring 44. The supplemental seal, generally designated 70 (FIG. 5), includes a circumferentially extending cloth seal 71 formed by arcuately extending sheet metal shims wrapped in a preferably woven metallic cloth and secured to the first-stage nozzle. Particularly, the supplemental seal 70 includes one, and preferably a pair of sheet metal plates or shims 72 and 74 overlaid on both sides by a woven metallic cloth 76. Seal 70 also includes a structural support bracket 80 which extends along one side of the seal and provides a rigid support for the seal. The metallic cloth and shims are integrally secured to the bracket 80 along their interfaces, for example, by welding.

Figure 5:
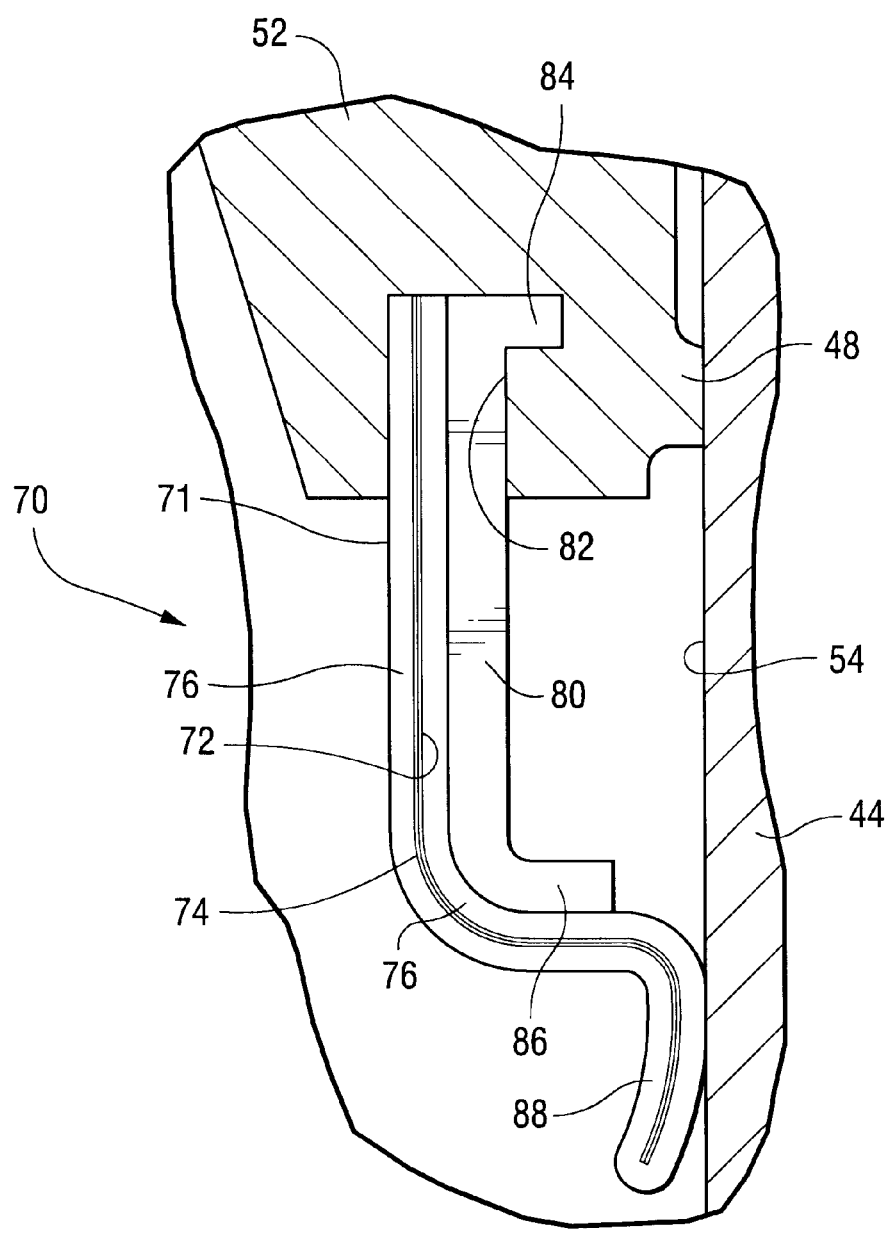
FIG. 5 is an enlarged fragmentary cross-sectional view illustrating a supplemental seal according to a preferred embodiment of the present invention.

To support the supplemental seal 70 from the nozzle segments, a generally L-shaped slot 82 is formed along the inner margin of each of the inner rails 52. The radial outer end of the bracket 80 includes an axially extending flange 84. As illustrated in FIG. 5, the outer ends of the cloth seal 71 and bracket 80 extend in the groove 82 and are secured therein, for example, by welding. Thus, the seal 70 projects radially inwardly from the inner rail 52 at a location axially spaced from the first sealing surface 54 of the nozzle support ring 44.

Figure 7:
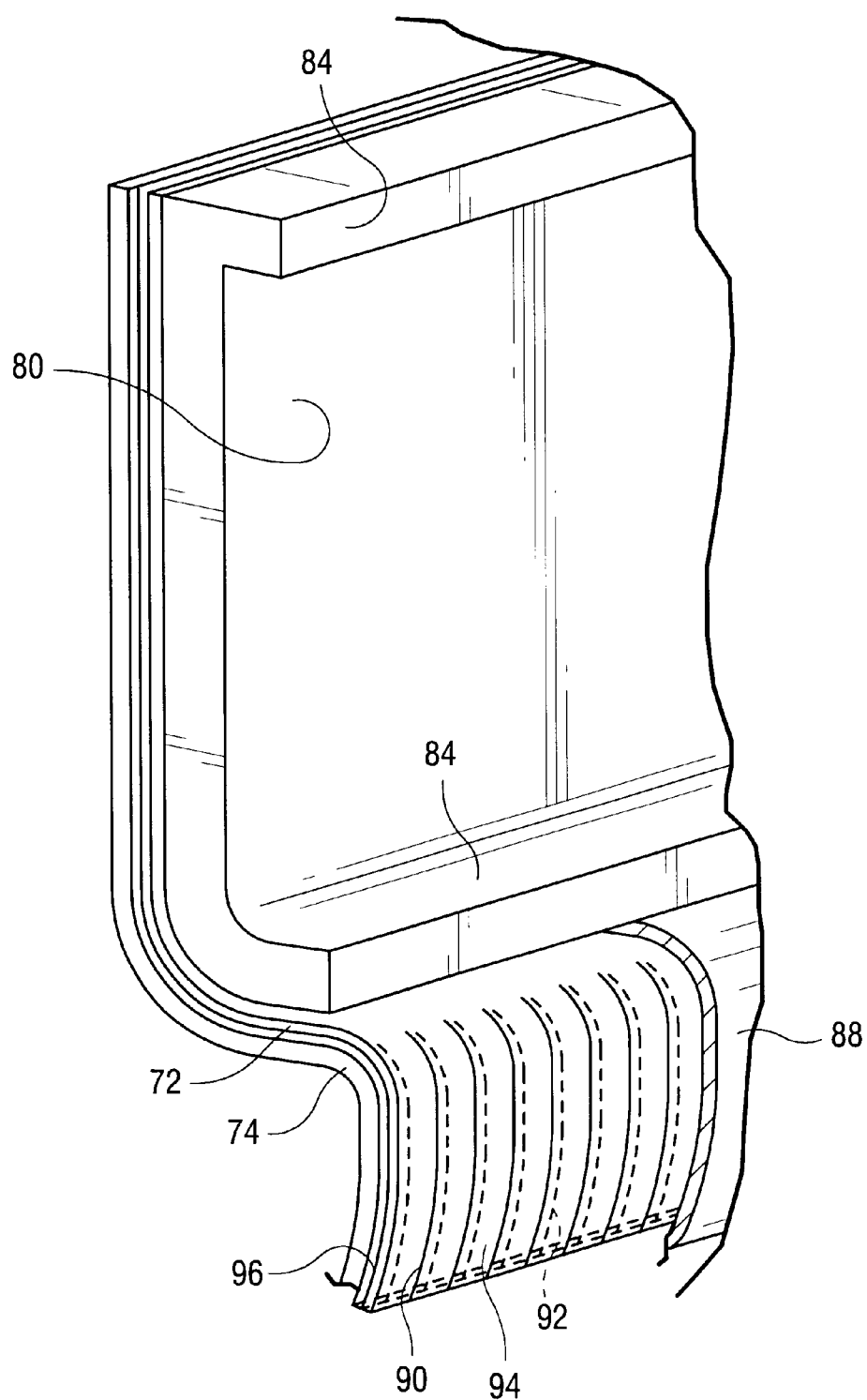
FIG. 7 is an enlarged fragmentary perspective view of the seal illustrating the slits in the legs or fingers of the supplemental seal.
Figure 8:
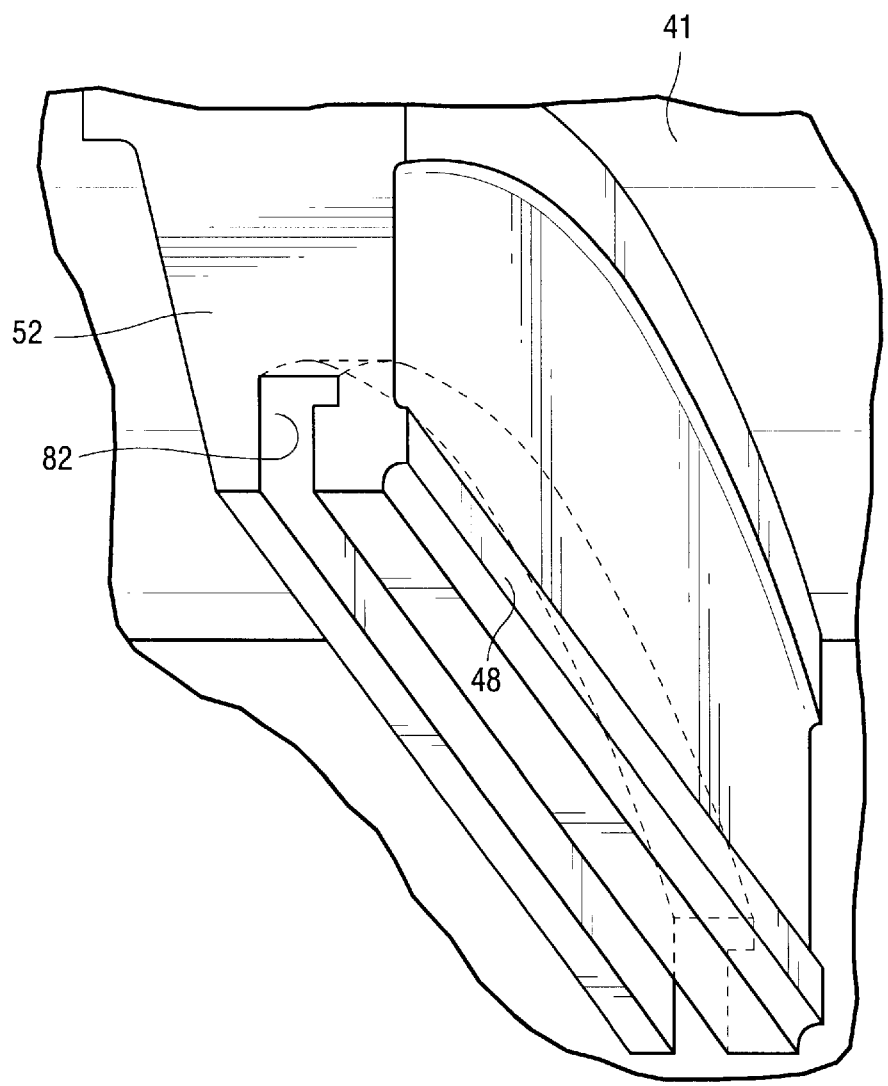
FIG. 8 is a fragmentary perspective view illustrating the slot along the inner rail for reception of the supplemental seal.

As illustrated in FIGS. 5 and 7, the bracket 80 also includes a flange 86 at its radial inner end projecting toward the sealing surface 54 but terminating short of surface 54. The cloth seal 71 wraps about the surface of flange 86 to extend toward the sealing surface 54 and is then bent or folded in a radial inward direction to form a seal leg or distal margin 88. The seal legs 88 bear against the sealing surface 54 with the woven metallic cloth in contact with the surface 54, effecting a supplemental seal. It will be appreciated that the shims 72 and 74 are also preloaded to maintain the legs 88 in sealing engagement against the surface 54.

As best illustrated in FIG. 7, the legs 88 of the shims 72 and 74 are slit at circumferentially spaced locations along the seal 70. For example, the leg 88 of shim 72 is slit at 90 at circumferentially spaced locations therealong. The leg of shim 74 is likewise slit at 92 at circumferentially spaced locations therealong. The slits 90 and 92 are staggered in a circumferential direction relative to one another such that the fingers 94 formed by the slits 90 of shim 72 overlie the slits 92 of the shim 74. The fingers 96 of shim 74 underlie the slits 90 of shim 72. The fingers 94 and 96 thus render the legs of the supplemental seal flexible, while affording a good seal between the slits.

Figure 9:
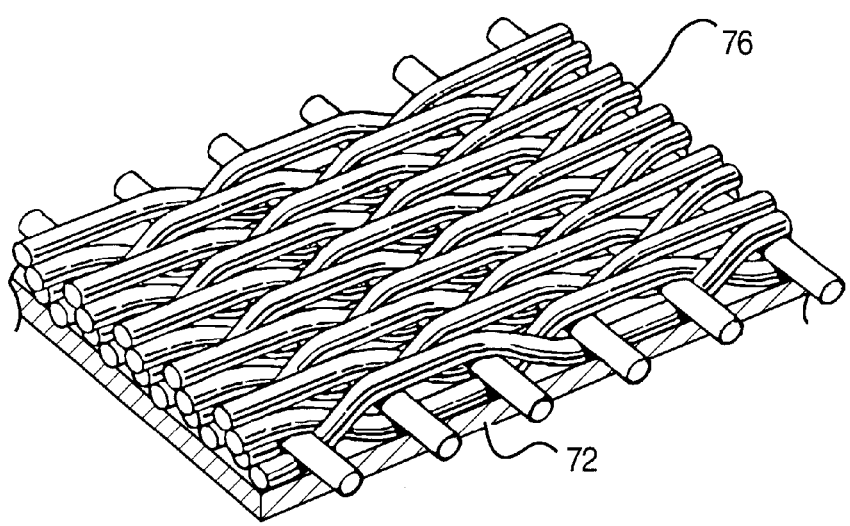
FIG. 9 is a perspective view of a metallic cloth weave for the supplemental seal hereof.

Referring to FIG. 9, there is illustrated a portion of a preferred metallic cloth 76 overlaying a shim, for example, shim 72. The cloth overlay is in the form of a Dutch twill weave. With the cloth formed of L605 or Haynes 188 material and with the relatively dense weave, effective seal and wear surfaces are provided.

Figure 6:
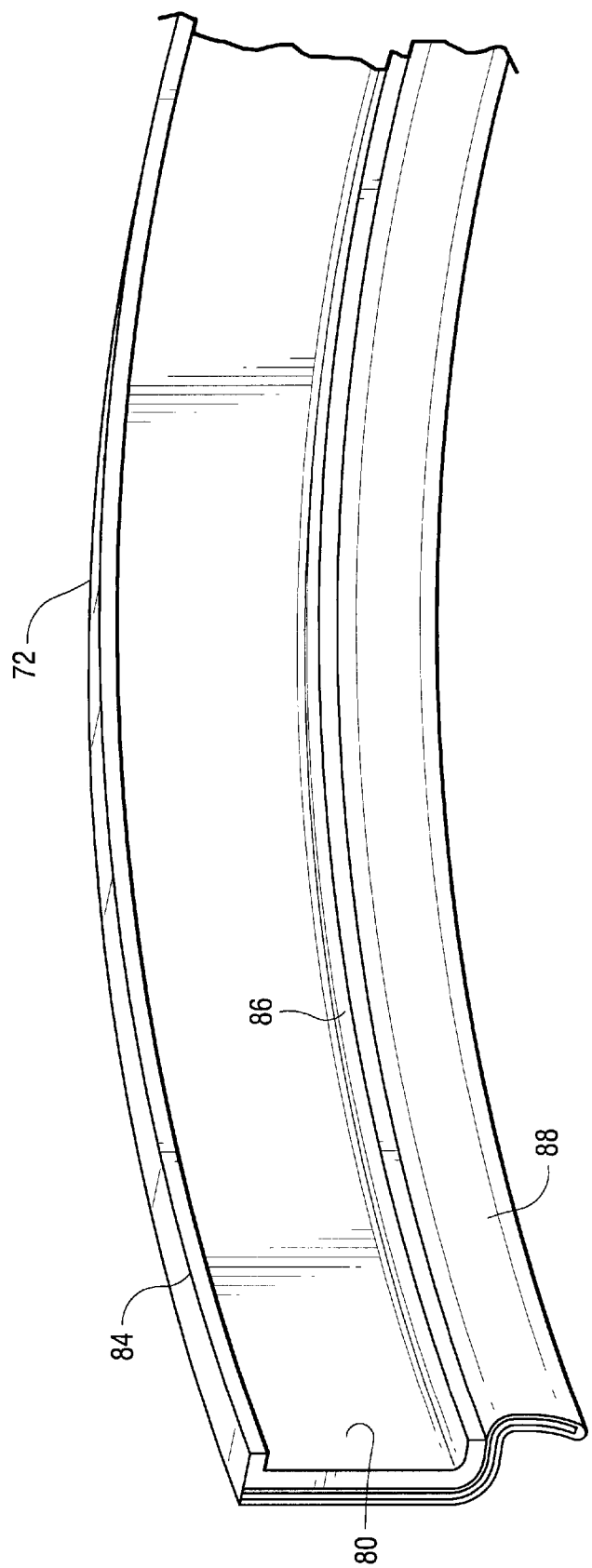
FIG. 6 is a perspective view of the supplemental seal of FIG. 5.

The supplemental seal 70 is provided preferably in two or four segments 72 (FIG. 6) of 90° or 180° circumferential extent, respectively. Consequently, the supplemental seal segments 72 overlie the joints between the nozzle segments 41 and thus reduce nozzle inter-segment leakage as well as the leakage past the chordal hinge seals. Alternatively, the supplemental seals 70 can be provided in segments corresponding in circumferential extent to the circumferential extent of each segment. The adjoining ends of the supplemental seals of adjacent segments in that case can then be overlapped to provide effective inter-segment seals.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine comprising:
    a turbine nozzle support ring having a generally axially facing first surface;
    a turbine nozzle segment having at least one stator vane and including an inner band having a second surface in axial opposition to said first surface;
    a seal depending from and extending radially inwardly of said inner band for sealing engagement against said first surface to seal between high and low pressure regions on opposite sides of said seal;
    said seal including a seal body having at least a first plate, an overlay of a woven metallic cloth and a distal margin covered by said cloth and engaging said first surface; and
    a support bracket secured to said inner band and extending along one side of said seal to support said seal body on a low pressure side thereof, said margin of said seal body being flexible and preloaded to seal against said first surface.

2. A turbine according to claim 1 wherein said seal body includes a second plate, said plates lying back-to-back with one another, said cloth extending as an overlay along opposite sides of said first and second plates.

3. A turbine according to claim 2 wherein said seal extends arcuately about an axis of the turbine, said plates having slits extending from edges thereof and along said margin to provide flexibility to said seal.

4. A turbine according to claim 3 wherein the slits along a margin of said first plate and the slits along a margin of said second plate are staggered relative to one another in a circumferential direction about the rotor axis.

5. A turbine according to claim 1 wherein said inner band includes an inner rail having a projection extending axially from said inner rail for sealing engagement against said first surface and forming a second seal therewith.

6. A turbine according to claim 5 wherein said projection extends linearly along said inner rail.

7. A turbine according to claim 6 wherein said sealing engagement between said projection and said first surface lies on the low pressure side of the first-mentioned seal.

8. A turbine according to claim 7 wherein the first seal extends arcuately about the axis of the turbine.

9. A turbine according to claim 1 wherein an intermediate portion of said seal body extends in a generally axial direction toward said first surface and said distal margin extends from said intermediate portion in a generally radial inward direction.

10. A turbine according to claim 9 wherein said support bracket has a distal flange extending along the intermediate portion of said seal on said low pressure side thereof.

11. A turbine comprising:
    a turbine nozzle support ring having a generally axially facing first surface;
    a plurality of turbine nozzle segments each having at least one stator vane and including an inner band having a second surface in axial opposition to said first surface;
    a seal comprised of a plurality of seal segments depending from and extending radially inwardly of said inner bands for sealing engagement against said first surface to seal between high and low pressure regions on opposite sides of said seal;
    each said seal segment including a seal body having at least a first plate, an overlay of a woven metallic cloth and a distal margin covered by said cloth and engaging said first surface; and
    a plurality of support brackets secured to said inner bands and extending along one side of said seal segments to support said seal bodies on a low pressure side thereof, said margins of said seal bodies being flexible and preloaded to seal against said first surface.

12. A turbine according to claim 11 wherein each said seal body includes a second plate, said first and second plates of each said seal body lying back-to-back with one another, said cloth extending as an overlay along opposite sides of said first and second plates.

13. A turbine according to claim 11 wherein each of said seal segments is arcuate and has a circumferential extent in excess of the circumferential extent of each nozzle segment, said seal segments spanning joints between adjacent nozzle segments.

14. A turbine according to claim 11 wherein each said seal body includes a second plate, said first and second plates of each said seal body lying back-to-back with one another, said cloth extending as an overlay along opposite sides of said first and second plates, each said seal extending arcuately about an axis of the turbine, said plates having slits extending from edges thereof and along said margin to provide flexibility to said seal.

15. A turbine according to claim 14 wherein the slits along a margin of said first plate and the slits along a margin of said second plate in each seal segment are staggered relative to one another in a circumferential direction about the rotor axis.

16. A turbine according to claim 11 wherein said inner band for each nozzle segment includes an inner rail having a projection extending axially from said inner rail for sealing engagement against said first surface and forming a second seal therewith.

17. A turbine according to claim 16 wherein said projections extend linearly along said inner rails.

18. A turbine according to claim 17 wherein said sealing engagement between said projections and said first surface lies on the low pressure side of the first-mentioned seal.

19. A turbine according to claim 18 wherein the first seal extends arcuately about the axis of the turbine.

20. A turbine according to claim 11 wherein an intermediate portion of said seal body extends in a generally axial direction toward said first surface and said distal margin extends from said intermediate portion in a generally radial inward direction.

21. A turbine according to claim 20 wherein said support bracket has a distal flange extending along the intermediate portion of said seal on said low pressure side thereof.

* * * * *